US007929908B2

(12) United States Patent
Tillotson

(10) Patent No.: US 7,929,908 B2
(45) Date of Patent: Apr. 19, 2011

(54) METHOD AND SYSTEM FOR CONTROLLING A NETWORK FOR POWER BEAM TRANSMISSION

(75) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 1326 days.

(21) Appl. No.: 11/420,086

(22) Filed: May 24, 2006

(65) Prior Publication Data

US 2007/0274226 A1 Nov. 29, 2007

(51) Int. Cl.
*H04B 7/00* (2006.01)
(52) U.S. Cl. .................... 455/13.4; 455/522; 455/343.1; 370/252; 370/338
(58) Field of Classification Search ................. 455/13.4
See application file for complete search history.

(56) References Cited

U.S. PATENT DOCUMENTS

| | | | | |
|---|---|---|---|---|
| 4,105,290 A * | 8/1978 | Quinn | ............ | 369/108 |
| 4,359,733 A * | 11/1982 | O'Neill | ............ | 342/36 |
| 5,355,138 A * | 10/1994 | Cances et al. | ............ | 342/354 |
| 5,400,037 A * | 3/1995 | East | ............ | 342/372 |
| 5,455,964 A * | 10/1995 | Roos et al. | ............ | 455/516 |
| 5,485,486 A * | 1/1996 | Gilhousen et al. | ............ | 370/335 |
| 5,498,297 A | 3/1996 | O'Neill et al. | | |
| 5,572,216 A * | 11/1996 | Weinberg et al. | ............ | 342/357.06 |
| 5,805,067 A * | 9/1998 | Bradley et al. | ............ | 340/635 |
| 5,812,947 A * | 9/1998 | Dent | ............ | 455/427 |
| 5,867,109 A * | 2/1999 | Wiedeman | ............ | 455/13.1 |
| 5,898,902 A * | 4/1999 | Tuzov | ............ | 455/13.1 |
| 5,940,769 A * | 8/1999 | Nakajima et al. | ............ | 455/509 |
| 5,949,369 A * | 9/1999 | Bradley et al. | ............ | 342/352 |
| 5,995,041 A * | 11/1999 | Bradley et al. | ............ | 342/357.1 |
| 5,999,127 A * | 12/1999 | Dezelan | ............ | 342/359 |
| 6,020,845 A * | 2/2000 | Weinberg et al. | ............ | 342/354 |
| 6,085,067 A * | 7/2000 | Gallagher et al. | ............ | 455/13.1 |
| 6,097,752 A * | 8/2000 | Wiedeman et al. | ............ | 375/130 |
| 6,246,874 B1 * | 6/2001 | Voce | ............ | 455/428 |
| 6,248,949 B1 | 6/2001 | Turner | | |
| 6,249,868 B1 * | 6/2001 | Sherman et al. | ............ | 713/168 |

(Continued)

OTHER PUBLICATIONS

Geoffrey A. Landis, Moonbase Night Power by Laser Illumination, Published in AIAA Journal of Propulsion and Power, vol. 8, No. 1, Jan. 1992, http://powerweb.grc.nasa.gov/pvsee/publications/lasers/laser_moon.html.

(Continued)

*Primary Examiner* — Yuwen Pan
*Assistant Examiner* — Hai V Nguyen
(74) *Attorney, Agent, or Firm* — McNees Wallace & Lurick LLC

(57) ABSTRACT

A method of providing power beams via a network of source nodes. Source nodes are configured to receive requests for power beam service from airborne user nodes such as aircraft equipped with photovoltaic receivers. User nodes are configured to communicate a set of parameters, such as location, mobility, field of regard, one or more beam wavelengths compatible with the receiver, the beam wavelength further described with a maximum sustained power, duty cycle and pulse repetition rate. Source nodes publish parameters to a network control system. Source nodes publish their location, velocity vector, orientation, available beam capacity, and a schedule of user nodes currently receiving service from the node. Source nodes selectively receive requests from user nodes, and respond to the requests to satisfy the user node parameters. Relays may be used to avoid obstructions, and deconflicting sensors and obstruction sensors may be used detect unauthorized or unusable beam paths.

28 Claims, 3 Drawing Sheets

U.S. PATENT DOCUMENTS

| | | | |
|---|---|---|---|
| 6,334,061 B1* | 12/2001 | Cunningham et al. | 455/553.1 |
| 6,364,253 B1* | 4/2002 | Cavanagh | 244/190 |
| 6,463,279 B1* | 10/2002 | Sherman et al. | 455/427 |
| 6,485,152 B2 | 11/2002 | Wood | |
| 6,498,585 B2* | 12/2002 | Jandrell | 342/357.12 |
| 6,507,739 B1* | 1/2003 | Gross et al. | 455/431 |
| 6,515,620 B1* | 2/2003 | Jandrell | 342/357.12 |
| 6,516,198 B1* | 2/2003 | Tendler | 455/456.3 |
| 6,531,653 B1 | 3/2003 | Glenn et al. | |
| 6,542,739 B1* | 4/2003 | Garner | 455/427 |
| 6,615,052 B1* | 9/2003 | Parmenter | 455/522 |
| 6,625,643 B1* | 9/2003 | Colby et al. | 709/217 |
| 6,628,234 B2* | 9/2003 | Jandrell | 342/357.12 |
| 6,628,921 B1* | 9/2003 | Vaddiparty et al. | 455/12.1 |
| 6,628,953 B1* | 9/2003 | Dillon et al. | 455/452.1 |
| 6,636,721 B2* | 10/2003 | Threadgill et al. | 455/12.1 |
| 6,650,285 B2* | 11/2003 | Jandrell | 342/357.12 |
| 6,760,566 B1* | 7/2004 | Wright et al. | 455/13.4 |
| 6,771,977 B1* | 8/2004 | Campbell | 455/522 |
| 6,774,841 B2* | 8/2004 | Jandrell | 342/357.12 |
| 6,775,251 B1* | 8/2004 | Wiedeman et al. | 370/316 |
| 6,792,259 B1* | 9/2004 | Parise | 455/343.1 |
| 6,818,818 B2 | 11/2004 | Bareis | |
| 6,850,497 B1* | 2/2005 | Sigler et al. | 370/310 |
| 6,859,181 B2* | 2/2005 | Colburn et al. | 343/725 |
| 6,882,309 B2* | 4/2005 | Bromley et al. | 342/357.12 |
| 6,895,233 B2* | 5/2005 | Chen et al. | 455/345 |
| 6,908,061 B2* | 6/2005 | Akahori | 244/96 |
| 6,931,232 B1* | 8/2005 | Wolcott | 455/12.1 |
| 6,947,733 B2* | 9/2005 | Tillotson | 455/423 |
| 6,955,324 B2* | 10/2005 | Tanielian | 244/3.13 |
| 6,971,756 B2 | 12/2005 | Vasylyev et al. | |
| 7,034,758 B2* | 4/2006 | Haidacher et al. | 343/725 |
| 7,057,553 B2* | 6/2006 | Jandrell | 342/357.12 |
| 7,062,254 B2* | 6/2006 | Hovestadt et al. | 455/412.1 |
| 7,068,991 B2* | 6/2006 | Parise | 455/343.1 |
| 7,072,634 B2* | 7/2006 | Tillotson | 455/296 |
| 7,080,299 B2* | 7/2006 | McLaurin | 714/726 |
| 7,095,980 B2* | 8/2006 | Toya | 455/13.1 |
| 7,154,437 B2* | 12/2006 | Bromley et al. | 342/357.12 |
| 7,184,703 B1* | 2/2007 | Naden et al. | 455/10 |
| RE39,503 E* | 3/2007 | Lynch | 455/13.1 |
| 7,221,945 B2* | 5/2007 | Milford et al. | 455/452.1 |
| 7,233,295 B2* | 6/2007 | Regala | 343/705 |
| 7,242,352 B2* | 7/2007 | Tavassoli Hozouri | 343/700 MS |
| 7,343,173 B2* | 3/2008 | Leedom, Jr. | 455/552.1 |
| 7,356,390 B2* | 4/2008 | Knoblach et al. | 701/4 |
| 7,366,463 B1* | 4/2008 | Archer et al. | 455/13.1 |
| 7,379,673 B2* | 5/2008 | Krill et al. | 398/118 |
| 7,391,755 B2* | 6/2008 | Gopalakrishnan et al. | 370/334 |
| 7,450,914 B2* | 11/2008 | Valdivia et al. | 455/121 |
| 7,450,974 B2* | 11/2008 | Bennett et al. | 455/574 |
| 7,554,481 B2* | 6/2009 | Cohen et al. | 342/14 |
| 7,593,724 B2* | 9/2009 | Karabinis | 455/427 |
| 2001/0014586 A1* | 8/2001 | Nakatsugawa | 455/13.1 |
| 2002/0022452 A1* | 2/2002 | Toya | 455/13.1 |
| 2002/0094825 A1* | 7/2002 | Endo et al. | 455/456 |
| 2002/0146030 A1* | 10/2002 | Simonsen et al. | 370/442 |
| 2003/0045289 A1* | 3/2003 | Zhao et al. | 455/435 |
| 2003/0050072 A1* | 3/2003 | Noerpel et al. | 455/452 |
| 2003/0157945 A1* | 8/2003 | Chen et al. | 455/458 |
| 2003/0221010 A1* | 11/2003 | Yoneya et al. | 709/227 |
| 2004/0024522 A1* | 2/2004 | Walker et al. | 701/210 |
| 2004/0142733 A1 | 7/2004 | Parise | |
| 2004/0198467 A1* | 10/2004 | Orlik et al. | 455/574 |
| 2004/0203716 A1* | 10/2004 | Tillotson | 455/423 |
| 2004/0233881 A1* | 11/2004 | Kang et al. | 370/338 |
| 2004/0266470 A1* | 12/2004 | Di Camillo et al. | 455/522 |
| 2005/0014499 A1* | 1/2005 | Knoblach et al. | 455/431 |
| 2005/0030224 A1* | 2/2005 | Koch | 342/357.07 |
| 2005/0096800 A1* | 5/2005 | Tanielian | 701/2 |
| 2005/0103943 A1* | 5/2005 | Tanielian | 244/190 |
| 2005/0118952 A1* | 6/2005 | Cox et al. | 455/62 |
| 2005/0273822 A1* | 12/2005 | Snell et al. | 725/64 |
| 2006/0030332 A1* | 2/2006 | Carrott et al. | 455/456.1 |
| 2006/0176169 A1* | 8/2006 | Doolin et al. | 340/521 |
| 2006/0250317 A1* | 11/2006 | Regala | 343/795 |
| 2007/0021140 A1 | 1/2007 | Keyes | |
| 2007/0155320 A1* | 7/2007 | Knoblach et al. | 455/12.1 |
| 2007/0178833 A1* | 8/2007 | Wahlberg et al. | 455/12.1 |
| 2008/0044187 A1* | 2/2008 | Krill et al. | 398/121 |
| 2008/0299990 A1* | 12/2008 | Knoblach et al. | 455/456.1 |
| 2008/0310850 A1* | 12/2008 | Pederson et al. | 398/135 |
| 2009/0028573 A1* | 1/2009 | Krill et al. | 398/125 |
| 2009/0135046 A1* | 5/2009 | Steele et al. | 342/27 |
| 2009/0176475 A1* | 7/2009 | Salkini et al. | 455/404.1 |

OTHER PUBLICATIONS

Geoffrey A. Landis, Satellite Eclipse Power by Laser Illumination, IAF-90-053, Published in Acta Astronautica, vol. 25, No. 4, pp. 229-233, 1991. http://powerweb.grc.nasa.pvsee/publications/lasers/IAF90_053.html.

Geoffrey A. Landis and Larry H. Westerlund, Laser Beamed Power: Satellite Demonstration Applications, IAF-92-0600, NASA CR-190793, http://powerweb.grc.nasa.gov/pvsee/publications/lasers/IAF92_0600.html, 43rd IAF Congress, Aug. 28-Sep. 5, 1992.

Mark J. O'Neill, Michael F. Piszczor, Michael I. Eskenasi, A.J. McDanal, Patrick J. George, Matthew M. Botke, Henry W. Brandhorst, David L. Edwards, Paul A. Jaster, The Stretched Lens Array (SLA): A Low Risk, Cost-Effective Concentrator Array Offering Wing-Level Performance of 180 W/KG and 300 W/M, IECEC 2002 Paper No. 20115, html version of the file http://www.aecable.com/corpinfo/Resources/IECEC%202002%20Paper%20NO.%2020115.pdf.

Geoffrey A. Landis, Mark Stavnes, Steve Oleson, John Bozek, AIAA-92/3213: Laser Power Beaming, Space Transfer with Ground-Based Laser/Electric Propulsion, http://powerweb.grc.nasa.gov/pvsee/publications/lasers/AIAA92_3213.html, Jul. 6-8, 1992.

* cited by examiner

METHOD AND SYSTEM FOR CONTROLLING A NETWORK FOR POWER BEAM TRANSMISSION

FIELD OF THE INVENTION

The present invention is directed to a method and system for controlling a network for power beam transmission, and more particularly to a system architecture for controlling beam power between multiple source nodes and user nodes.

BACKGROUND OF THE INVENTION

Aircraft combustion engines that burn hydrocarbon fuels are limited in their flight altitude because at high altitudes, there is insufficient oxygen to sustain combustion. Aircraft that operate on combustion engines are also limited in the total time and distance that can be achieved between landings, due to the weight and quantity of fuel that they must transport. Aircraft that do not rely on combustion engines can achieve higher flight altitude, as well as longer flight times, than aircraft that rely on combustion engines. Some high-altitude airplanes have been powered by solar power, but sunlight has low intensity under the best circumstances and is unavailable at night. For example, the HELIOS Prototype is a solar powered aircraft developed by NASA and AeroVironment Inc., of California, as part of the Environmental Research Aircraft and Sensor Technology (ERAST) program. However, limitations have been encountered with the operation of HELIOS and other solar-powered aircraft.

Solar intensity is especially low during winter months in higher latitudes. The transmission of power beams, or "power beaming", is one solution that was developed to alleviate the problem of low-intensity regions of solar power. The concept of power beaming goes back at least as far as the famous scientist Nikola Tesla (1856-1943). There is a large body of literature regarding power beaming, which is also referred to at times as "wireless power transmission." Power beaming includes a set of technologies that transmit large, non-destructive amounts of power from some source to some receiver via electromagnetic waves, e.g. microwaves or light. Power beaming can provide the equivalent energy levels of high-intensity sunlight with nearly 100% duty cycle.

Power beaming has been used to demonstrate the feasibility of use in small aircraft. However, power beaming from a single beam power source to a single user node such as a small aircraft, has limited usefulness. The user node is constrained to flight within the direct line-of-sight of the source node, and the reliability of the user node or aircraft is dependent on the reliability of the power source or source node. Singular source nodes do not have the ability to handoff user nodes from one source to the next to improve flight reliability of the user aircraft node, and to enable a user aircraft node to receive sufficient power to sustain flights of long-distance or long-duration.

A single source may be configured with power beam characteristics that are incompatible with a particular aircraft—e.g., the power beam may be too powerful or too weak. Since there is not a uniform standard for power beaming, interoperability becomes difficult, reducing the value of each type of aircraft and each type of source node.

Current ground-based power beam source nodes encounter additional obstacles to power transmission. Atmospheric obstacles such as clouds or turbulence interfere with the power transmissions by scattering light. Since some user nodes receive the power via arrays of photovoltaic cells that are limited in area, much of the transmitted power becomes unfocused due to such spreading and is lost.

Maintaining airborne surveillance is another challenge that cannot be effectively achieved using combustion propulsion, as political and military factors reduce airborne intelligence, surveillance and reconnaissance (ISR) below 100 thousand feet. Higher altitude surveillance is desirable because of the ability to acquire a larger visible area ratio as the altitude of the surveillance aircraft increases. Strong winds at extreme altitudes cause conventional airships to consume a prohibitive amount of power just for holding the airship in a fixed position, thus making fixed wing aircraft more desirable.

Providing for the needs and capabilities of multiple user nodes, source nodes, and relays to create a distributed power beaming system is a complex undertaking. Such a system is unable to function properly without interoperability and the ability to represent various attributes and interactions between the nodes of the power-beaming network.

Applying Network Centric Operations (NCO) concepts and expertise to directed energy weapons and power beaming, the present invention addresses a need to make directed energy platforms more network-compatible.

There is a need for a power beaming network architecture to enable each beam-powered aircraft to be served by one or more power beams in various locations to accomplish high-altitude flights of extreme duration. There is also a need for a distributed network of power beaming source nodes to allow the source nodes to be built in smaller sizes in order to reduce the cost per unit of power.

SUMMARY OF THE INVENTION

The present invention is directed to a system power beam transmission system. The system includes a plurality of source nodes. Each source node is configured to generate a power beam usable by at least one user node. A control system controls operation of the source nodes, one or more user nodes and a communication system. The communication system transmits signals between the plurality of source nodes and the user node or nodes. The user nodes are configured to transmit messages via the communication system to at least one source node. The user node messages include one or more of a set of operative parameters, a power beam service request; and at least one acceptance message. The acceptance message is sent in response to at least one offer from one of the source nodes. Each source node is configured to transmit, upon receipt of a user node message, an offer to provide power beam service in response to the power beam service request. The offer to power beam service commits the source node to provide a power beam service corresponding to the set of operative parameters of the user node or nodes. The source node delivers a power beam to the user node or nodes in response to receiving an acceptance message or messages from the user node or nodes.

In another aspect, the present invention is also directed to a user node for receiving transmissions of power beams from a network of power beam source nodes including an airborne vehicle. The airborne vehicle is configured to communicate via a communication system a preferably predetermined set of operative parameters; broadcast a request for power service from a user node to at least one source node of a plurality of source nodes in the network; and communicate at least one acceptance message in response to at least one offer from one of the plurality of source node.

The present invention is also directed to a method of controlling power transmission of power beams from a plurality of power beam source nodes to one or more airborne vehicles or nodes. The method includes the following steps: providing a plurality of source nodes, a control system for configuring the plurality of source nodes and at least one user node, and a communication system for transmitting signals between the plurality of source nodes and the at least one user node, wherein each user node is configured to communicate via the communication system a preferably predetermined set of parameters; broadcasting a request for power service from a user node to at least one source node of the plurality of source nodes; determining a set of operative parameters of a requesting user node in response to a need for power; transmitting at least one offer to provide power service from at least one source node of the plurality of source nodes in response to the broadcast request for power service, wherein the offer commits the at least one source node to provide a power beam service corresponding to the set of operative parameters of the requesting user node; communicating from the requesting user node at least one acceptance message in response to the at least one offer; and delivering a power beam of the at least one source node in response to the at least one acceptance message.

The method also includes communicating a set of power beam parameters and a set of physical parameters associated with each source node of the plurality of source nodes, and communicating a set of user parameters from at least one user node.

The present invention will enable aircraft to fly higher, e.g. in the "near space" range from 20 km to 100 km altitude, and for longer durations, e.g. over 30 days at a time, while carrying heavy, power-hungry payloads such as AMTI and GMTI radars.

An advantage of the present invention is that mobile user nodes may rely on multiple beam sources for power, rather than limiting their dependence to a single beam source.

Another advantage of the present invention is that range of travel of a mobile user node is increased beyond the range of a single beam source by enabling handoffs between multiple source nodes.

A further advantage of the present invention is increased reliability and availability by having multiple sources of power.

Yet another advantage of the present invention is that the unit size of individual beam sources in the network can be decreased, which decreases overall cost per unit of power, and decreases the logistical burden.

Still another advantage of the present invention is increased range and reliability by the inclusion of relays in the architecture to provide pathways around airborne obstacles.

Another advantage of the present invention is the generality of the architecture and its interoperability, e.g., a source node may support multiple types of user nodes that it was not specifically designed to support, and a user node may use power from a variety of source nodes.

Finally, the use of an infosphere for communication within the architecture reduces communication traffic, software integration complexity, and software development for system management.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
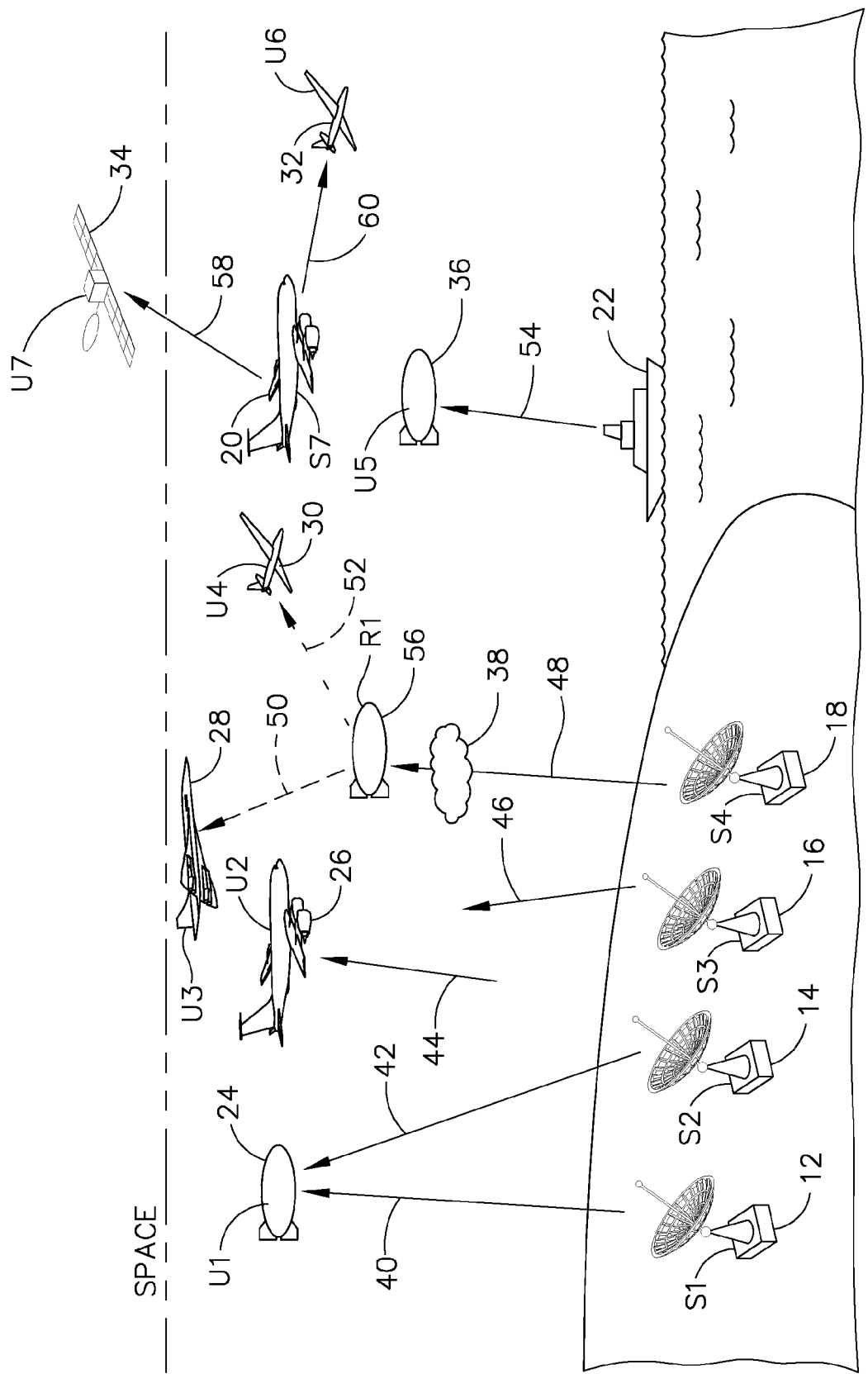
FIG. 1 is an exemplary arrangement of a network of nodes using the present invention.

Referring to FIG. 1, an exemplary system of the present invention has a plurality of source nodes 12, 14, 16, 18, 20 & 22. Source nodes 12-22 include fixed nodes 12, 14, 16 & 18 and mobile nodes 20 & 22, and combinations thereof. The system also has beam-powered user nodes 24, 26, 28, 30, 32, 34 & 36 and communication systems (not shown) for each beam-powered user node 24-34 to request power from a plurality of source nodes 12-22. The user node 24-34 specifies a set of preferably predetermined parameters, including, e.g., an acceptable time interval, and acceptable parameters relative to the power beam, e.g., the wavelength of a power beam that the user node may receive, the pulse rate of the power beam, a duty cycle, engagement geometry, size of beam, etc. The system also includes one or more relays 56 for directing power beams around airborne obstructions 38.

Each source node 12-22 is configured to specify its power delivery capability, e.g., the wavelength of its power beam, the pulse rate of delivery, a duty cycle, a field of regard, a beam angle, etc., as well as the available capacity of the source node 12-22. The system has the ability to assign source nodes 12-22 and relays 56, from a plurality of source nodes 12-22 and relays 56, to satisfy the service requests of user nodes 24-34. The system may assign multiple source nodes 12-22 to individual user nodes 24-34, and configure a source node 12-22 to time-share the power beam of the source node 12-22 among multiple user nodes 24-34. The system also is configured to optimize power beam assignments, by taking into account atmospheric conditions that present obstacles between source nodes 12-22 and user nodes 24-34. Obstacles include such atmospheric conditions as clouds 38, smoke, or turbulent regions. The system configuration preferably includes a method to deconflict airspace to prevent power beams from damaging vehicles or persons. There is also provided a verification means to verify that a scheduled connection between source nodes and user nodes has been successfully established, and to make new node assignments if a scheduled connection fails. The system also has the ability to transfer each user node to new source nodes or relays when the user node or source node moves out of range for power transfer, or, for example, a power failure of the source node occurs, or the user node revises its power requirements up or down.

Referring again to FIG. 1, Source node 14 has a first beam 42, and a second beam 44. The second beam 44 is been illuminating a fast-moving user node, 26. At the moment shown, source node 14 is executing a beam transmission pursuant to commitment to node 26, and the commitment is expiring. Source node 16 is just beginning a new commitment to node 26, so the beam 44 from source node 14 is ending and the beam 46 from source node 16 is starting.

Source node 18 is transmitting a power beam 48 to relay 56 via a microwave beam 48 that goes through a cloud obstacle 38. Relay 56 has a single outgoing beam 50, 52, which it time-shares between two user nodes, user node 28, and user node 30. User node 28 requires more power than user node 30, and therefore receives about twice as much beam time as user node 30, the differences in beam power levels indicated by longer dashes in the arrow 50 to user node 28.

Source node 22 is a mobile, sea-going node. Source node 20 is an airborne mobile source node. Mobile source node 20 has two outgoing beams 58, 60. Beam 60 goes to airborne user node 32. Another beam 58 from source node 20 is transmitted to an orbiting satellite user node, 34. The satellite user node 34 is orbiting the Earth in lower space orbit, beyond the Earth's atmosphere.

Figure 2:
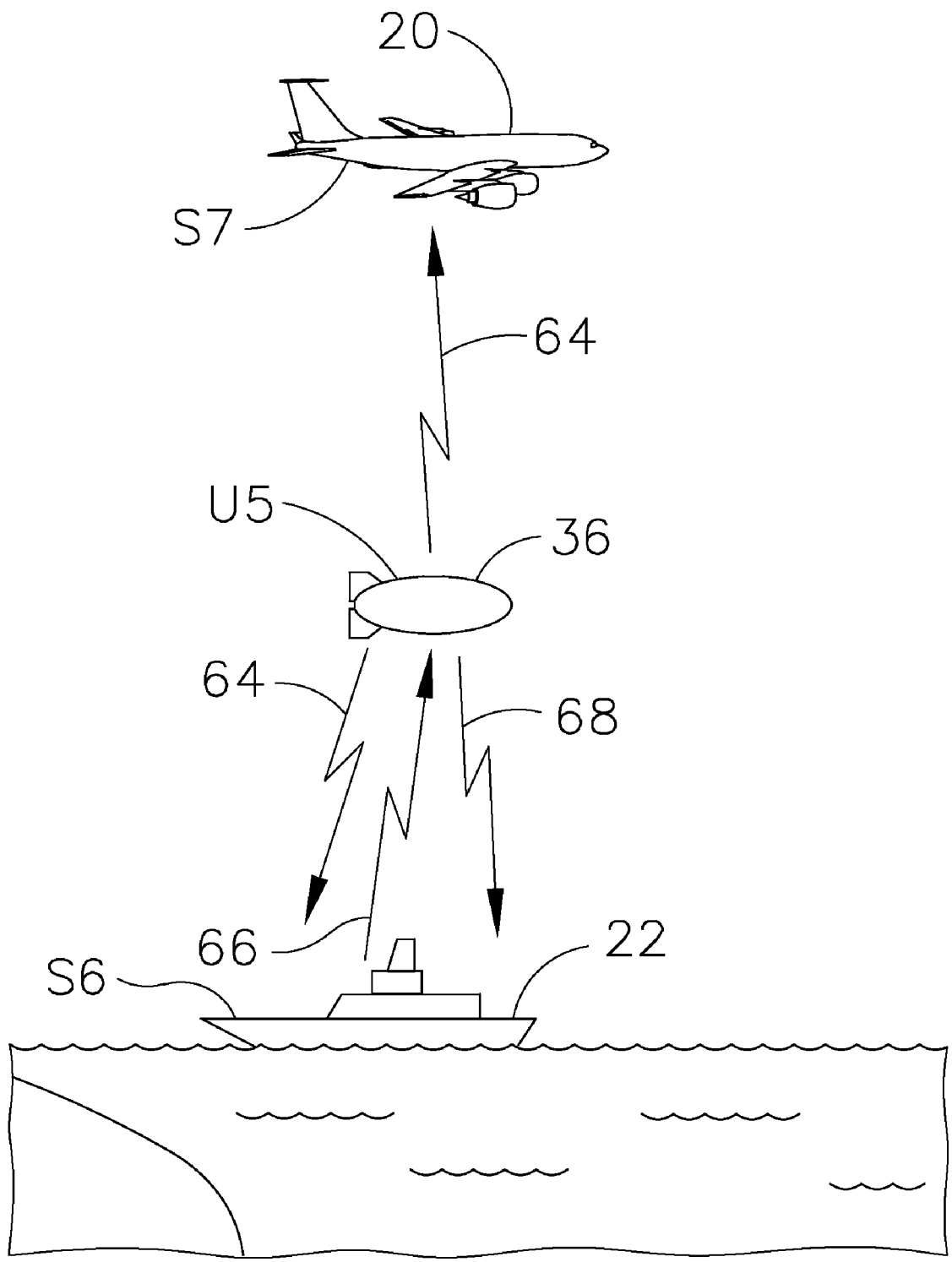
FIG. 2 shows an example of a communications link of the present invention.

FIG. 2 shows example communications leading to service for user node 36. First, user node 36 transmits a broadcast, represented by arrows 64, requesting service. The request 64 includes an indicator that the servicing beam must arrive at user node 36 from a direction that is below the local horizon. Source nodes 22 and 20 receive the broadcast request 64. Source node 22 responds to user node 36 by transmitting an offer, represented by arrow 66, to provide a power beam 54 within the parameters specified in the request to user node 36. Source node 20 does not respond to request 64, since the request required the source node to deliver a beam that is below the local horizon, and the position of source node 20 above user node 36 is unsuitable for such an engagement geometry. In this example, user node 36 receives no other offers from source nodes. It transmits an acceptance message, represented by arrow 68, to source node 22 to initiate the transaction. Shortly thereafter, the power delivery service should begin transmission from source node 22.

Figure 3:
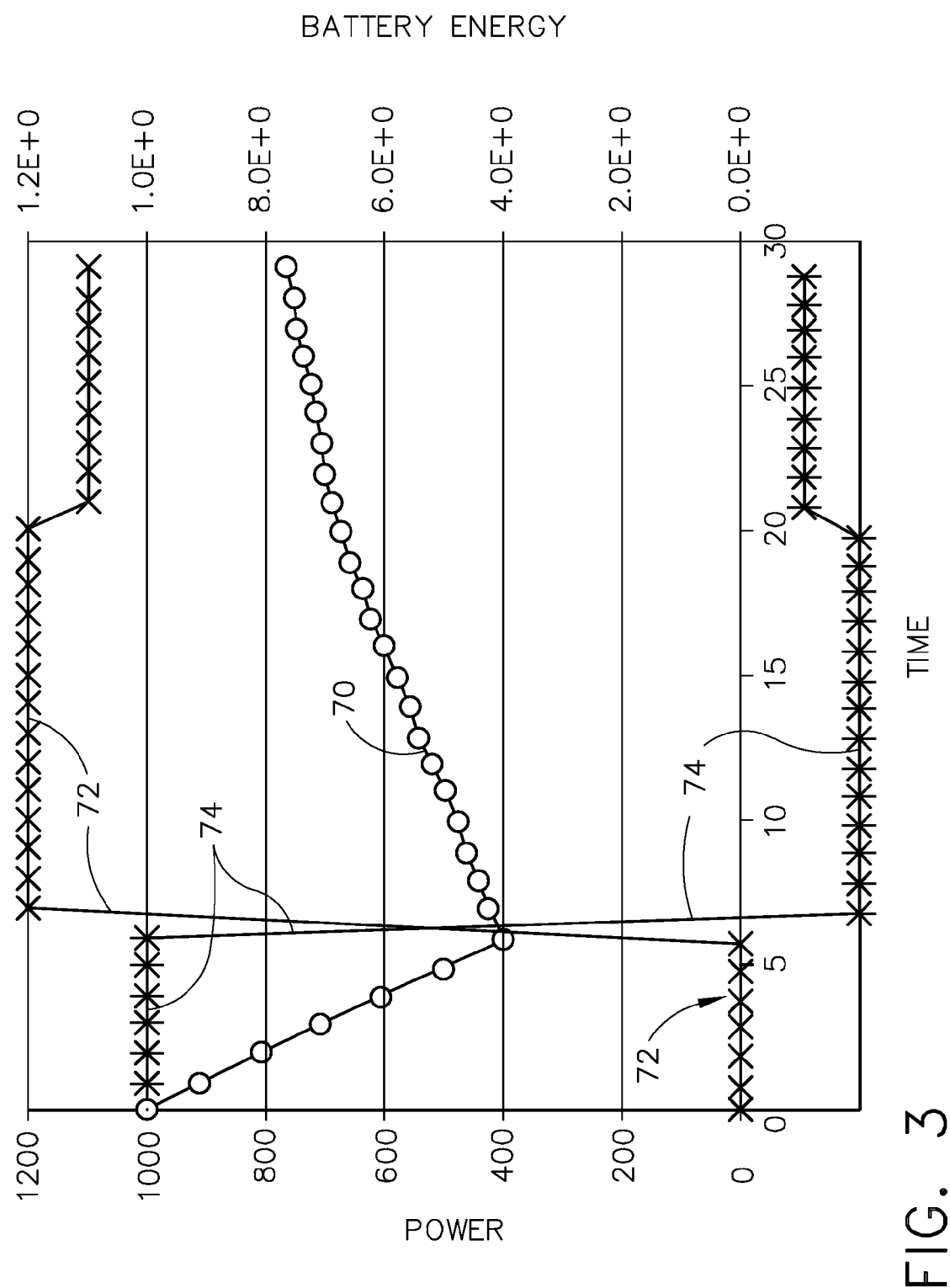
FIG. 3 is a graph of the result of a simulation where an airborne user node traverses a path served by two widely-separated source nodes.

Referring next to FIG. 3, the results of a simulated power transfer between a single user and multiple source nodes are graphically illustrated. In this simulation an airborne user node traversed a path served by two widely-separated source nodes. The simulation includes two events enabled by the system architecture:

the user node's initial request for beam power, which is satisfied by power from a stationary source node that provide 12 kW of beamed power a second request when the user node moves out of range of the first source node. This is satisfied by power from a second source node that provides only 11 kW.

The line designated as 70 represents battery energy (in Joules) and indicates energy available in the on-board battery of a user node. In the simulation scenario, the user node requests service when its on-board energy drops below $5\times10^5$ Joules. At the time of the first request, at approximately 5 minutes, the user node is within range of the source node. The source node is capable of delivering a 12 kW power beam. The line designated 72 represents "Beam in" (in Watts) and indicates the amount of power reaching the user node receiver. At time equals approximately 7 minutes, the power beam begins arriving from a first source node. The user node has sufficient incoming power to keep flying and to begin recharging its battery. At time equals approximately 21 minutes, the user node moves out of range of the first source node and issues a request for a new source node to supply a beam. A second source node begins delivering a beam with 11 kW of power, while the user node travels onward and continues charging its battery at a slightly lower rate. The power deficit is indicated by line 74, which approximates a mirror image of the beam in line 72. Thus, when the power deficit 74 is high the "beam in" 72 is low, and the battery is generally discharging; when the power deficit 74 is low, the "beam in" 72 is high and the battery is charging.

The system preferably does not specify particular types of source nodes or user nodes. Rather, the system provides an operational and technological framework within which the source nodes and user nodes can operate effectively.

Source Nodes

In the system of the present invention, a source node is defined as a node that transmits power via one or more beams. Each source node can communicate its properties in response to an initial query message.

The properties of a source node can be described by various parameters, including:

whether the source node is a mobile or stationary node;

the field of regard of the source node relative to the axes of the vehicle on which the beam source is mounted, or if the source node is immobile, the field of regard of the source node relative to geographic axes;

one or more power beam wavelengths that the source node is configured to deliver. For each beam wavelength that a source node is configured to transmit, the source node can specify the following parameters:

the maximum sustained beam power that the source node can transmit;

the maximum duty cycle, i.e., the ratio of the maximum duration of beam transmission in a pulse, to the minimum duration of no transmission between pulses;

a pulse repetition rate—the pulse repetition rate is zero if the beam is constant; pulse repetition rate may be specified within a range of pulse rates;

the duration of a pulse;

a nearest acceptable focal distance to a user node, i.e., some beams can converge to a target at modest distance, e.g. 10 km;

and a minimum angular width of the beam at infinity.

Other parameters may be added to describe a power beam and characteristics, within the scope of the present invention, as will be appreciated by those skilled in the art. Thus, the above list of parameters is provided by way of example and not limitation.

The source node can also communicate parameters that describe the current physical parameters of the source node, in response to a request for update. The current physical parameters communicated by the source node can include the following:

the current location of the source node;

the current velocity vector of the source node the current orientation of the source node, with respect to axes of a vehicle on which the source node is mounted. This orientation is preferably defined relative to geographic axes to allow computation of its current field of regard, based on its response to the initial query.

the identification of all user nodes to which it is currently sending power and the power being consumed by each of the identified user nodes;

the available energy capacity remaining at the source node, e.g. for a node that burns fuel to power its beam, the remaining energy capacity is a function of the fuel expended.

The current physical parameters of the source node may be communicated once, in response to a user node inquiry. Alternately, the current operative situation of the source node may be communicated periodically, e.g., as part of a system for tracking some or all of the source nodes in the system. The list of parameters set forth above with respect to user nodes is not intended to be exhaustive, and may include additional parameters as warranted by particular circumstances, as known to those who are skilled in the art.

In a distributed-control implementation of the present invention, each source node is configured to track its power capability parameters. For example, each source node may continuously or iteratively assess its own commitments and capabilities by comparing them to each request for power, and sending an appropriate response based on the tracked parameters. In response to a request for power, the source node may deny the request by a user node or offer to provide power. The source node may deny a request if insufficient resources are available, or for other reasons, such as for example, the location of the requesting user node, or obstacles obstructing the direct path between the source node and the user node. If able to satisfy all or part of a user node request, the source node communicates to the requesting source node an offer to provide power. The offer communicated by the source node specifies the format, the user node and the time interval of the power beam. If the user node communicates an acceptance of the offer from the source node back to the user node, the source node commits the necessary resources to fulfill that offer and executes the agreement at the parameters specified in the offer.

In an alternate embodiment of the present invention, there is a centralized controlled system. The centralized control system may be configured to track the power capabilities of all or some of the source nodes in the system. In the centralized control system, each source node receives commands from an authorized controller. Each command from the authorized controller directs the source node to provide power in a specific format to a specific user node for a specific time interval.

In either the distributed control or centralized control embodiments, each source node is configured to acquire a user node, track the user node, and transmit power in accordance with a commitment to provide power. Each source node is also configured to receive feedback parameters from a cooperating user node to maintain an accurate beam pointing and focus on the receiver of the user node. When power begins to flow from a mobile source node, the mobile source node maneuvers as appropriate, within the specified parameters of the beam geometry. In a preferred embodiment, the source node includes software that optimizes the source node flight pattern based on the mission constraints, other power beam commitments, the location, and weather obstacles that affect the beam.

Each source node is also configured to communicate a non-compliance message in response to a determination by the source node that the source node is unable to satisfy a request, or a commitment to a given user node. This response by the source node enables the user node to identify other suitable source nodes to satisfy its power needs. Possible reasons for non-compliance by a source node with a request from a user node may include, by way of example and not a limitation, a malfunction, a detected obstacle, an unplanned change of flight path, a higher-priority request, or deconfliction with other vehicles approaching the beam path.

In a preferred embodiment the system would automatically perform all of the above-described capabilities. However, it is also within the scope of the present invention for some of the above-described capabilities to be provided by human operators.

User Nodes

The present invention defines a user node as a node that receives power via one or more power beams. Each user node can communicate its properties and request power service. The properties of a user node can be described by various parameters, including the following:
whether the user node is mobile or stationary
the field of regard of the user node relative to the axes of the vehicle on which the user node is mounted, or if the user node is immobile, the field of regard of the user node relative to geographic axes;
one or more beam wavelengths that the user node is configured to receive. The acceptable beam wavelengths may be given as a range.

For each wavelength or sub-range of wavelengths, the user node can specify the following parameters:
the maximum sustained beam power that the user node is configured to receive; an acceptable pulse repetition rate—the pulse repetition rate is zero if the beam is constant, and the pulse repetition rate may be specified within a range of pulse rates;
a pulse duration that the user node is configured to receive, which may be specified within a preferably predetermined range.

The user node can also describe, in response to a request for update:
the current location of the user node;
the current velocity vector of the user node
the current orientation of the user node, with respect to axes of a vehicle on which the user node is mounted. This orientation is preferably defined relative to geographic axes to allow computation of its current field of regard, based on its receipt of a response to the initial query The current physical parameters of the user node may be communicated once, or alternately, the current physical parameters of the user node may be communicated periodically, e.g., as part of a system for tracking some or all of the nodes in the system. The list of parameters set forth above with respect to user nodes is not intended to be exhaustive, and may include additional parameters as warranted by particular circumstances, as known to those who are skilled in the art.

Each user node can communicate requests for power to other nodes in the system. In a preferred embodiment of a distributed-control system, the user node communicates queries via an infosphere to identify all the available source nodes that are capable of meeting the power requirement of the user node. Infosphere, as used herein, means middleware that provides four major functions: publish, subscribe, advertise, and query. The query by the user node may include fields such as the user node location, and beam wavelength or wavelengths, pulse format and power levels of the user node, etc. If the user node receives no offers from source nodes in response to the query by the user node, then the user node may expand or revise the parameters of the query. This may require re-planning the flight of the user node, or the payload operation, in order to accommodate a non-optimal offer by a source node.

The user node may be required to revise its query several times and repeat them, with the queries being modified each time for less than optimal service. If the responses from source nodes indicate that the source node or nodes are unable to supply the user node with power sufficient for the user node, the user node executes a predetermined contingency plan. For example, the user node may be a manned vehicle, and would require making arrangements to land the vehicle before the remaining energy of the user node is exhausted.

When the user node receives offers of power supply from various source nodes in response to a query, the user node selects one or more of the offers. The user node then communicates an acceptance message in response to the offer message of the selected source node, or nodes if from multiple source nodes. If the source node or nodes selected by the user node begin to provide power service as agreed, the user node executes the plan. However, if the source node or nodes selected by the user node do not begin service as agreed, e.g., as a result of hardware failure or an unforeseen occlusion by clouds, the user node communicates a new query for power.

In an alternate embodiment, the system uses a central control system. The user node in a central control system communicates a request for power to an authorized control node. The control node responds to the user node request with a denial, or with a command to the user node to accept power from one or more specified source nodes. The user node communicates a confirmation message to the control node when the specified source begins service as specified, or a failure message if the specified source does not provide service as specified. The control node may be a source node configured for control functions, or a separate, standalone node in the network.

In the case of a mobile user node, when power is received, the user node positions itself according to the parameters of the agreed beam geometry. In a preferred embodiment, the user node is programmed to select optimized flight patterns based on one or more predefined parameters, including the mission, location and capacity of the user node, and weather obstacles that affect the transmission of the power beam.

The user node communicates with the source node to provide feedback to help the source node to maintain aimpoint, beam quality, etc. The feedback communicated by the user node may be passive feedback, e.g. corner reflectors, or active feedback, e.g. networked communication packets that report measured errors of the incoming beam, or combinations thereof.

The user node transmits a "change request" message if it is necessary to interrupt the transmission of the power beam before the agreed time, or to adjust the duty cycle or power level of the received power beam.

Relays

A relay is defined as a device that transmits power in one or more beams, and it receives power in one or more other beams. Relays are used as intermediate nodes for delivering power beams around obstacles, such as clouds or mountains, that obstruct direct line-of-sight power beam transmissions between source and user nodes.

In the system architecture of the present invention, a relay provides functions of both a user node and of a source node. In particular, a relay is configured to receive a request for service from a user node and pass the request on to other source nodes. In order for a relay to fulfill a power request by a user node, the relay must receive power from a source node. Therefore, when a relay receives a request for power, it computes how much additional power the relay must receive, factoring in the losses or inefficiency of the relay, then re-transmits a derived request that is greater in total power than the original user node request. If the derived request of the relay is able to be fulfilled by one or more source nodes, the relay transmits an offer to deliver a power beam to the requesting user node. When the acceptance of the offer is received by the relay, then the relay communicates its acceptance of the offer or offers that the relay received from the source node(s). A power beam is then transmitted from the source node(s) to the relay, and the relay in turn transmits a power beam to the requesting user node. Until a request from a user node is received, the relay remains in a standby mode.

A relay may be configured to convert power from one wavelength to another, e.g. from a microwave frequency to an optical frequency.

Sensors

The present invention employs two classes of sensors, obstacle sensors and deconfliction sensors. Obstacle sensors detect and quantify parameters related to obstacles that affect the transmission of various types of power beams. For example, power beams may be adversely affected by rain, clouds, smoke, regions of strong air turbulence, mountains, etc. Obstacle sensors may be physically embodied in a variety of ways. Video cameras, human inputs, weather forecasts, radar, or measured quality of beams traversing a region of the atmosphere are examples of devices that may be used as obstacle sensors. Other devices may be used as obstacle sensors as are well known to those skilled in the art.

A common characteristic shared by obstacle sensors is the ability to communicate information about obstacles to user nodes, source nodes or control nodes. In a preferred embodiment, obstacle sensors publish this information to an infosphere where it becomes available to any interested node of the system.

Deconfliction sensors are configured to detect conflicts and potential conflicts with beam transmissions. The deconfliction sensors are also configured to communicate information about areas through which beams should not be transmitted, or where beams may only be transmitted within defined limitations, due to presence of vulnerable assets. Vulnerable assets may include, for example, people on the ground, flammable trees in a drought-stricken region, manned aircraft, or other safety, logistical or ecological factors.

Deconfliction sensors may be physically embodied in a variety of ways, e.g. radar, human input, or an air traffic control network. A common characteristic that is shared by deconfliction sensors is the ability to transmit information about vulnerable assets or restricted areas to user nodes, source nodes or control nodes. A restricted area may include a traffic lane in which flights are planned. This is a typical method used to deconflict airspace in wartime. Information about conflicts may be as simple as setting a bit to 1 or 0 for a given location. Preferably, however, the deconfliction information would include more information, such as indicating whether a vulnerable asset is present; describing allowable intensity and total fluence for various wavelengths, and indicating any variation affecting deconfliction, with respect to the engagement angle of the beam. Deconfliction information enables nodes in the network to estimate whether a particular proposed beam transmission would pose a real threat to each asset. Deconfliction sensors may preferably be configured to publish deconfliction information to an infosphere, where the information is available to any interested node in the network.

Control Architecture

The control architecture of the system is configured to assign source nodes to user nodes. Decisions regarding assignment of beam transmissions may occur at user nodes or at a control node. Decisions regarding beam transmission conflicts can be made at user nodes, source nodes, or control nodes.

In one embodiment of the present invention, each user node broadcasts a request message to source nodes as shown in FIG. 2. Each source node decides whether to decline the user node request, or to offer to transmit power, based the capacity and available resources of the source node to fulfill the request. The source nodes that decide to extend offers, communicate the offers to the user node directly or via a network. The user node selects the offer or offers to accept, communicates its acceptance of the offer(s), and beam transmission service begins. In the embodiments of the invention that include beam deconfliction, all nodes in the system must periodically broadcast their locations and/or planned paths so that each source node or user node can perform deconfliction before extending or accepting an offer, and perform deconfliction periodically while the beam transmission service is provided. This method is conceptually similar to the link assignment method described in commonly-owned U.S. Pat. No. 6,947,733 entitled "Method And Apparatus For Reducing Self Interference In A Mobile Network", and is hereby incorporated by reference. That invention dealt with communication interference, whereas in the present invention, deconfliction avoids physical harm.

In a centrally controlled system architecture, all nodes are configured to periodically report their status to a control node. User nodes send requests to the control node. The control node decides which source node should handle each request, sends an order to the selected source node, and awaits confirmation from the user node that the service is provided. When a user node moves from one region to another, it may come under control of a different control node, just as airliners today come under control of different ATC centers when they cross the country.

Communication Architecture

In a preferred embodiment of the present invention, each user node sends a request message as a broadcast. The user node broadcast may be a radio frequency (RF) broadcast signal, or a logical broadcast transmitted across a data network to all source nodes. Source nodes extending offers to supply power beams transmit such offers directly to the user node. These signals may be transmitted directly via RF signal, or across a data network. The user node communicates acceptance of the offer to the selected source node in the same or similar manner as the original broadcast, and service begins.

In the embodiments of the invention that include beam deconfliction, all nodes are configured to periodically broadcast their locations and/or planned paths so each source node or user node can perform deconfliction before extending or accepting an offer.

As discussed above, the present invention includes an infosphere-enabled architecture. In an infosphere-enabled architecture, each node is configured to publish its location periodically to the infosphere. "Location" may include the planned path as well, so that other nodes can predict where the publishing node will be.

Each source or user node subscribes to receive location data from the infosphere about other network nodes so that the node can analyze deconfliction information. Further, in the infosphere-enabled architecture, user nodes are configured to publish requests for power beams via the infosphere. The infosphere selectively passes the requests to source nodes which have indicated suitability by subscribing to certain types of requests. For example, a source node may have indicated to the infosphere the ability to cover requests by user nodes in predetermined geographic areas, and within a specified range of wavelengths and power levels. The infosphere-enabled architecture eliminates message traffic to nodes that are predetermined to be unsuitable for requests. In a centrally-controlled architecture with an infosphere, control nodes subscribe to requests; source nodes do not. Source nodes and user nodes may subscribe to orders, which the central control node publishes.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A power beam transmission system comprising:
a plurality of source nodes, each source node of the plurality of source nodes being configured to generate a power beam usable by at least one user node; a control system to control operation of the plurality of source nodes; at least one user node; and a communication system for transmitting signals between the plurality of source nodes and the at least one user node;
the at least one user node being configured to transmit user node messages via the communication system to at least one source node, the user node messages including one or more of a set of operative parameters; a power beam service request; and at least one acceptance message in response to at least one offer from one of the plurality of source nodes;
each source node of the plurality of source nodes being configured upon receipt of a user node message to transmit an offer to provide power beam service in response to the power beam service request, wherein the offer to power beam service commits the source node to provide a power beam service corresponding to the set of operative parameters of the at least one user node and to deliver a power beam to the user node in response to receiving the at least one acceptance message from the user node;
wherein the at least one user node is further configured to receive the power beam.

2. The system of claim 1, wherein each source node of the plurality of source nodes is configured to communicate a set of power beam parameters, the power beam parameters including:
an indicator whether the source node is a mobile or stationary node;
a field of regard of the at least one source node relative to the at least one source node;
at least one power beam wavelength the source node is configured to deliver;
a maximum sustained beam power that the source node can transmit;
a maximum duty cycle;
a pulse repetition rate;
a pulse duration;
a nearest acceptable focal distance; and
a minimum angular width of the beam at infinity.

3. The system of claim 2, wherein each source node is also configured to communicate a set of physical parameters of the source node, the set of physical parameters including:
a location of the source node;
a velocity vector of the source node;
an orientation of the source node;
a listing identifying user nodes and user node power consumption; and
an available energy capacity.

4. The system of claim 3, wherein the field of regard being determined with respect to axes of a vehicle on which the source node is mounted.

5. The system of claim 4, wherein the orientation is provided relative to geographic axes to allow computation of its current field of regard based on a response to a query.

6. The system of claim 1, wherein the at least one user node is configured to communicate a set of user parameters, the user parameters including:
an indicator whether the user node is mobile or stationary;
a field of regard of the user node;
at least one beam wavelength which the user node is configured to receive;

a maximum sustained beam power;
an acceptable pulse repetition rate; and
a pulse duration.

7. The system of claim 4, wherein the user node is also configured to communicate, in response to a request for update, a set of user physical parameters, the user physical parameters including:
a location;
a velocity vector; and
an orientation.

8. The system of claim 7, wherein each source node of the plurality of source nodes is configured to track its power capability parameters and to assess the capability of entering a power delivery commitment based on the tracked power capability parameters.

9. The system of claim 8, wherein each source node of the plurality of source nodes is further configured to communicate a non-compliance message in response to a determination by the source node that the source node is unable to satisfy a request, or a commitment to a given user node.

10. The system of claim 6, wherein the field of regard of the user node is provided relative to the axes of the vehicle on which the user node is mounted.

11. The system of claim 6, wherein the at least one user node is stationary, and the field of regard of the at least one user node is provided relative to geographic axes.

12. The system of claim 6, wherein the at least one beam wavelengths that the user node is configured to receive is provided as a range of wavelengths.

13. The system of claim 1, wherein each source node of the plurality of source nodes is configured to acquire a user node, track the position of a user node, transmit power in response to a commitment to provide power to a user node, and to receive a set of feedback parameters from a user node receiving power from the source node, the set of feedback parameters including beam pointing and focusing information for a receiver of the user node.

14. The system of claim 1, wherein at least one source node of the plurality of source nodes is a mobile node that includes software to optimize the source node movement pattern based on optimizing parameters, the optimizing parameters including: mission constraints, total power beam commitments, source node location, and weather obstacles.

15. The system of claim 1, wherein the communication system includes an infosphere for publication of user node queries to identify any source nodes of the plurality of source nodes that are available to provide the power request of the at least one user node.

16. The system of claim 1, wherein the communication system is a centralized communication system, the centralized communication system being configured to centrally control requests from user nodes, to direct the requests to at least one source node of the plurality of source nodes, and to direct the at least one source node of the plurality of source nodes to provide power in a format of the at least one user node.

17. The system of claim 1, also including:
providing at least one relay for passing service requests between the at least one user node and at least one source node of the plurality of source nodes;
wherein the relay is configured to:
receive the request for service from a user node;
compute the additional power the relay requires based on an efficiency parameter of the relay;
retransmit to the at least one source node of the plurality of source nodes a derived power beam request greater than the original user node power request;
in response to receiving at least one offer from at least one source node to provide the requested power, transmit the offer to the requesting user node;
in response to receiving an acceptance signal from the user node, communicate the acceptance of the at least one offers that the relay received from the at least one source node;
receive power from the at least one source node; and
forward at least a portion of the received power to the user node.

18. The system of claim 1, wherein each source node of the plurality of source nodes includes an obstacle sensor, wherein the obstacle sensor is configured to detect and quantify parameters related to obstacles that affect the transmission of power beams.

19. The system of claim 18, wherein each source node of the plurality of source nodes is provided with a deconfliction sensor, wherein the deconfliction sensor is configured to detect conflicts and potential conflicts with beam transmissions.

20. The system of claim 19, wherein each source node of the plurality of source nodes and each of the at least one user node is configured to periodically broadcast a location and a planned path to enable all source nodes or user nodes to perform deconfliction before extending or accepting an offer.

21. A method of controlling power transmission of power beams from a plurality of power beam source nodes to at least one user node, the method comprising:
providing a control system for configuring the plurality of source nodes and the at least one user node, and a communication system for transmitting signals between the plurality of source nodes and the at least one user node, wherein each user node is configured to communicate via the communication system a set of parameters;
broadcasting a request for power service from the at least one user node to at least one source node of the plurality of source nodes;
determining a set of operative parameters of the requesting user node in response to a need for power;
transmitting at least one offer to provide power service from at least one source node of the plurality of source nodes in response to the broadcast request for power service, wherein the offer commits the at least one source node to provide a power beam service corresponding to the set of operative parameters of the requesting user node;
communicating from the requesting user node at least one acceptance message in response to the at least one offer; and
delivering a power beam of the at least one source node in response to the at least one acceptance message.

22. The method of claim 21, further including: communicating a set of power beam parameters from each source node of the plurality of source nodes;
the power beam parameters including:
an indicator whether the source node is a mobile or stationary node;
a field of regard the at least one source node relative to the at least one source node;
at least one power beam wavelength the source node is configured to deliver;
a maximum sustained beam power that the source node can transmit;
a maximum duty cycle;
a pulse repetition rate;
a pulse duration;

a nearest acceptable focal distance; and
a minimum angular width of the beam at infinity.

23. The method of claim 22, further including: communicating a set of physical parameters of the source node, the set of physical parameters including:
a location of the source node;
a velocity vector of the source node;
an orientation of the source node;
a listing identifying user nodes and user node power consumption to which the communicating source node is currently providing power service;
an available energy capacity.

24. The method of claim 21, further including: communicating a set of user node parameters, the user node parameters including:
an indicator whether the user node is mobile or stationary;
a field of regard of the user node;
at least one beam wavelength which the user node is configured to receive;
a maximum sustained beam power;
an acceptable pulse repetition rate;
a pulse duration.

25. The method of claim 24, further including: communicating, in response to a request for update, a set of user node physical parameters;
the user node physical parameters including:
a location;
a velocity vector; and
an orientation.

26. The method of claim 21, wherein the at least one user node comprises an airborne vehicle.

27. The user node of claim 26, wherein the airborne vehicle is flying in an altitude range of 20 km to 100 km.

28. The method of claim 21, wherein the request for power service is broadcast to a plurality of source nodes comprising a combination of fixed and mobile source nodes.

* * * * *